United States Patent [19]

Yale

[11] Patent Number: 4,888,129
[45] Date of Patent: Dec. 19, 1989

[54] PROCESS FOR PRODUCING A TERBIUM-ACTIVIATED GADOLINIUM OXYSULFIDE X-RAY PHOSPHOR HAVING A SPECIFIC GREEN/BLUE EMISSION RATIO BY THE ADDITION OF ZINC

[75] Inventor: Ramon L. Yale, Towanda, Pa.

[73] Assignee: GTE Products Corporation, Stamford, Conn.

[21] Appl. No.: 341,886

[22] Filed: Apr. 24, 1989

[51] Int. Cl.$^4$ .............................................. C09K 11/84
[52] U.S. Cl. ........................ 252/301.6 S; 252/301.4 S
[58] Field of Search ..................... 252/301.4 S, 301.6 S

[56] References Cited

U.S. PATENT DOCUMENTS

| | | | |
|---|---|---|---|
| 3,563,909 | 2/1971 | Schuil et al. | 252/301.4 S |
| 3,705,858 | 12/1972 | Luckey et al. | 252/301.4 S |
| 3,883,747 | 5/1975 | Murashige et al. | 252/301.4 S |
| 4,113,648 | 9/1978 | Ferri et al. | 252/301.4 S |
| 4,507,560 | 3/1985 | Mathers et al. | 252/301.4 S |
| 4,690,832 | 9/1987 | Yale | 252/301.6 S |

FOREIGN PATENT DOCUMENTS 60-15485  1/1985  Japan ............................ 252/301.6 S

OTHER PUBLICATIONS

"The Influence of ZnO on the Luminescence of LaOBr:Tb$_{0.0075}$", J. Liu; General Research Institute of Nonferrous Metals, Beijing, China, Y. Wu and F. P. Wang, Dept. of Physics, Beijing University of Iron and Steel Technology, Beijing, China, J. of Lumuin., 40 & 41, 1988, pp. 899–900.

*Primary Examiner*—Jack Cooper
*Attorney, Agent, or Firm*—Robert E. Walter; L. Rita Quatrini

[57] ABSTRACT

A terbium activated gadolinium oxysulfide phosphor having a green/blue emission ratio of from about 0.7 to about 2.0 is disclosed. A process is disclosed for producing this phosphor which comprises forming a uniform mixture of gadolinium oxide, sulfur, alkali carbonate, alkali phosphate, terbium oxide, wherein the terbium oxide is provided in an amount sufficient to result in a terbium concentration of from about 0.25% to about 0.9% by weight, and a zinc compound wherein the zinc compound is provided in an amount sufficient to result in a zinc concentration of from about 0.05% to about 1.0% by weight, the zinc concentration and the terbium concentration resulting in the above ratio, the ratio increasing as the zinc concentration increases and as the terbium concentration increases, heating the mixture in an atmosphere in a covered vessel at a temperature of from about 900° C. to about 1400° C. for a sufficient time to form terbium-activated gadolinium oxysulfide, washing the terbium-activated gadolinium oxysulfide with deionized water to remove essentially all of any water soluble impurities which are present, annealing the resulting washed terbium-activated gadolinium oxysulfide in air at a temperature of from about 525° C. to about 590° C. for about 1 hour to about 3 hours to enhance the brightness of the phosphor.

2 Claims, 2 Drawing Sheets

PROCESS FOR PRODUCING A TERBIUM-ACTIVIATED GADOLINIUM OXYSULFIDE X-RAY PHOSPHOR HAVING A SPECIFIC GREEN/BLUE EMISSION RATIO BY THE ADDITION OF ZINC

CROSS REFERENCE TO RELATED APPLICATION

This application is related to application Ser. No. 341,887, entitled "Improved Hydrolysis Resistance of Rare Earth Oxysulfides By The Addition of Zinc Compounds In Synthesis", filed concurrently herewith and assigned to the same assignee as the present application.

BACKGROUND OF THE INVENTION

This invention relates to a process for adjusting the green/blue emission ratio of a terbium-activated gadolinium oxysulfide x-ray phosphor by addition of zinc to the initial raw material mixture which is heat-treated to form the phosphor. More particularly as the amount of zinc increases the ratio increases.

In the field of x-ray intensifier screens, it is sometimes desirable to adjust the green/blue emission ratio of the phosphor. In this way, the phosphor emission can be adjusted to the sensitivity of the film being used.

SUMMARY OF THE INVENTION

In accordance with one aspect of the invention, there is provided a terbium activated gadolinium oxysulfide phosphor having a green/blue emission ratio of from about 0.7 to about 2.0.

In accordance with another aspect of the invention, there is provided a process for producing the above described phosphor which comprises forming a uniform mixture of gadolinium oxide, sulfur, alkali carbonate, alkali phosphate, terbium oxide, wherein the terbium oxide is provided in an amount sufficient to result in a terbium concentration of from about 0.25% to about 0.9% by weight, and a zinc compound wherein the zinc compound is provided in an amount sufficient to result in a zinc concentration of from about 0.05% to about 1.0% by weight, the zinc concentration and the terbium concentration resulting in the above ratio, the ratio increasing as the zinc concentration increases and as the terbium concentration increases, heating the mixture in an air atmosphere in a covered vessel at a temperature of from about 900° C. to about 1400° C. for a sufficient time to form terbium-activated gadolinium oxysulfide, washing the terbium-activated gadolinium oxysulfide with deionized water to remove essentially all of any water soluble impurities which are present, annealing the resulting terbium-activated gadolinium oxysulfide in air at a temperature of from about 525° C. to about 590° C. for about 1 hour to about 3 hours to enhance the brightness of the phosphor.

DETAILED DESCRIPTION OF THE INVENTION

Figure 1:
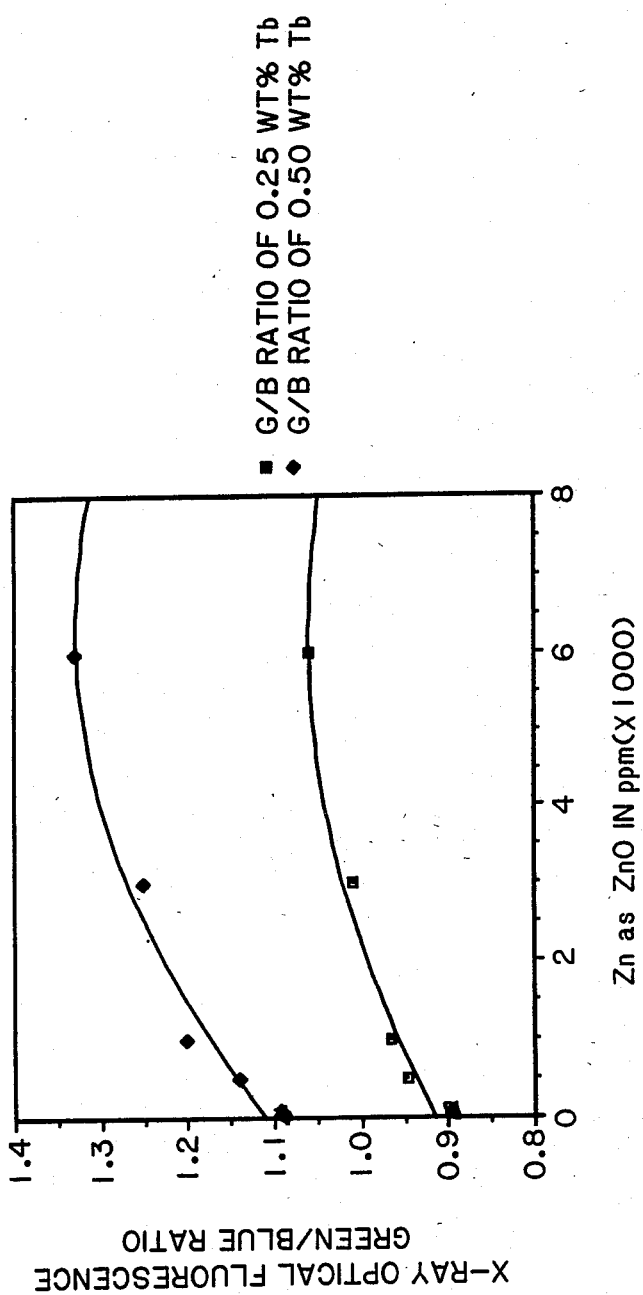
FIG. 1 is a plot of green/blue emission ratio versus concentration of zinc in the initial raw material mixture for specific terbium concentrations.

For a better understanding of the present invention, together with other and further objects, advantages, and capabilities thereof, reference is made to the following disclosure and appended claims in connection with the above described figures and descriptions of some of the aspects of the invention.

The present invention provides a process for adjusting the green/blue emissio ratio in a terbium-activated gadolinium oxysulfide phosphor by the addition of zinc in the form of a zinc compound to the initial reaction mixture. As the amount of zinc that is added increases, the green/blue emission ratio increases. The terbium concentration affects the green/blue emission ratio. As the terbium concentration increases, the ratio increases. The combination of the highest terbium concentrations and the highest zinc concentrations result in the highest ratios.

The phosphor is made by first forming a relatively uniform mixture of the reactants of which the terbium-activated gadolinium oxysulfide is to be formed. They are gadolinium oxide, sulfur, alkali carbonate, alkali phosphate, and terbium oxide. The alkali carbonate can be sodium carbonate, potassium carbonate or a combination of these. It is especially preferred to use sodium carbonate. The alkali phosphate can be sodium phosphates, potassium phosphate or a combination of these. It is especially preferred to use sodium monohydrogen phosphate. A zinc compound is added also. The amount of zinc that is added is sufficient to result in from about 0.05% to about 1.0% by weight in the mixture. This amount of zinc results in a green/blue emission ratio of from about 0.7 to about 2.0 in the final product phosphor depending on the terbium concentration which can vary from about 0.25% to about 0.9% by weight in the mixture. Increasing amounts of zinc results in an increase in this ratio within the ranges given. The terbium concentration affects the green/blue emission ratio. The ratio increases as the terbium concentration increases.

The resulting mixture is heated in an air atmosphere in a covered vessel which is typically made of aluminum oxide, at a temperature of from about 900° C. to about 1400° C. and preferably from about 900° C. to about 1300° C. for a sufficient time preferably for about about 2 hours to about 8 hours. The above temperatures and times allow for flexibility that has to be maintained in order to be able to adjust for proper particle size, as additions of zinc can affect particle size. For example, zinc concentration generally affects particle growth at higher temperatures.

The resulting heated material which is terbium-activated gadolinium oxysulfide is then washed with deionized water to remove essentially all of any water soluble impurities such as polysulfides which are present normally as by products of the reaction. This is done by slurry techniques which are familiar to those skilled in the art.

Typically, the resulting washed terbium-activated gadolinium oxysulfide is then deagglomerated. Deagglomeration can be done by wet milling. This is done typically by milling about 400 g of material with about 300 ml of deionized water per liter of the milling container with about 1 kilogram of milling media such as $\frac{3}{8}''$ high density alumina balls. The milling is done typically in a one liter polypropylene container of about $3\frac{1}{2}''$ in diameter for about 30 minutes at about 80 rpm. Deagglomeration can be done also by dry milling the phosphor after it has been washed and dried. The same weights and volumes as stated above can be used with the exception of the deionized water.

If the resulting washed phosphor is dried, the drying is done preferably at a temperature of from about 100° C. to about 150° C. for about 2 to about 4 hours.

The resulting phosphor is then annealed in air which is usually ambient air at a temperature of from about 525° C. to about 590° C. and preferably from about 550° C. to about 575° C. for a sufficient time preferably from about 1 hour to about 3 hours to enhance the brightness in the final product phosphor.

The phosphor can be classified if desired to obtain the desired particle size.

FIG. 1 is a plot of green/blue emission ratio versus the amount of zinc that is added to the initial mixture of raw material reactants at terbium concentrations of 0.25% and 0.50% by weight. It can be seen that as the amount of zinc increases, the green/blue emission ratio increases. The Figure demonstrates that the green/blue emission ratio of $Gd_2O_2S$:Tb can be adjusted by altering the amount of zinc that is added at a specific terbium level.

Figure 2:
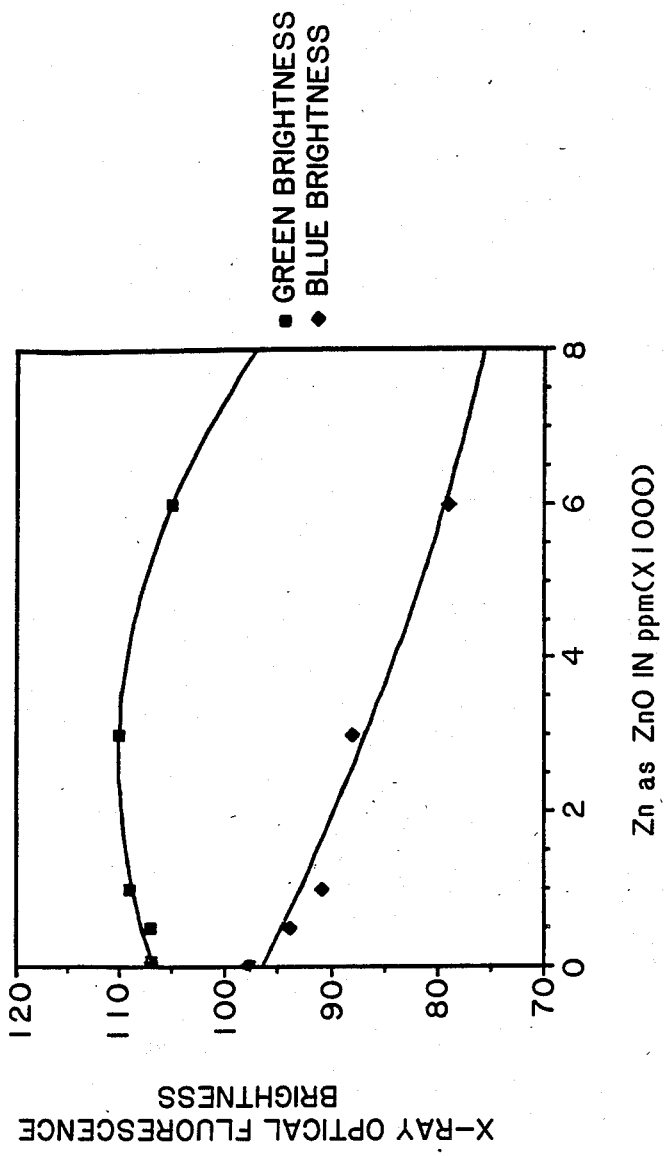
FIG. 2 is a plot of x-ray optical fluorescence blue and green brightness versus concentration of zinc in the initial raw material mixture at a terbium concentration of about 0.5% by weight.

FIG. 2 it a plot of x-ray optical fluorescence blue and green brightness versus concentration of zinc in the initial raw material mixture at a terbium concentration of about 0.5% by weight. It can be seen that these brightness values vary with the amount of zinc that is added. This is important because it is sometimes necessary to adjust the green and blue brightness or the green/blue emission ratio to match the sensitivity of the film being used.

Green/blue ratios of about 1.77 to about 1.93 have been effected using 6500 weight ppm zinc as zinc oxide, zinc chloride, zinc sulfate, zinc fluoride and zinc sulfide. This is shown in the Table below.

TABLE

Addition of Zn compounds to reaction mixture to form $(Gd_{0.99}Tb_{0.01})_2O_2S$
Amount of zinc is 6500 weight ppm in initial reaction mixture

| Type of Zn compound | Green/Blue emission ratio |
| --- | --- |
| Control (no Zn) | 1.48 |
| ZnO | 1.91 |
| $ZnCl_2$ | 1.83 |
| $ZnSO_4.H_2O$ | 1.77 |
| ZnS | 1.85 |
| $ZnF_2$ | 1.93 |

A comparison of the control with the various zinc-treated samples shows that zinc affects the green/blue emission ratio. It appears that the type of zinc compound used does not significantly affect the ratio.

The typical method of measuring x-ray optical fluorescence (XOF) brightness and green/blue emission ratios given in the present invention is described below.

X-ray optical fluoresence (XOF) brightness is the measurement of emitted luminescence when luminescent material is exposed to x-ray emission from a standard x-ray tube at about 80 KVP and 20–30 milliamps. The luminescence is measured by a S-20 photomultiplier tube and a Gamma Model 2900 Auto Photometer coupled to a fen inch strip chart recorder. The phosphor is placed into a brass holder with a two centimeter diameter by one millimeter deep sample area. It is then inserted into an integrating sphere where the sample is exposed to the emitted x-rays. The resultant emission from the phosphor is fed to the photomultiplier tube and autophotometer through various filters which pass selective bands of emitted light. The "blue" filter used is a Tiffen #39 filter that has a fifty percent band pass between 300 and 460 nanometers. The "green" filter is a narrow band pass 545 nanometer filter such as that supplied by Perkin Elmer Corporation.

To more fully illustrate this invention, the following nonlimiting example is presented.

EXAMPLE

The following dry blend of materials is made up:

| | |
| --- | --- |
| $Gd_2O_3$ | 180.3 g |
| $Tb_4O_7$ | 0.935 g |
| S | 48.00 g |
| $Na_2CO_3$ | 53.00 g |
| $Na_2HPO_4$ | 14.20 g |
| ZnO | 1.532 g (to provide about 6500 weight ppm of Zn) |

The mixture is placed in an alumina crucible, covered and heated for about 2 to 8 hours at about 1000° C. to about 1400° C. in a gas fired or electric furnace. The fired material is cooled and washed with deionized water to remove the water soluble byproducts. The washed material is dried for about 2 to 4 hours at a temperature of from about 100° C. to about 150° C., deagglomerated and placed into a suitable crucible or tray and heat treated in ambient air for about 1 to 3 hours at a temperature of from about 525° C. to about 590° C. The green/blue emission ratio is about 1.91.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing a terbium-activated gadolinium oxysulfide x-ray phosphor, said process comprising:
    (a) forming a uniform mixture of gadolinium oxide, sulfur, alkali carbonate, alkali phosphate, terbium oxide, wherein said terbium oxide is provided in an amount sufficient to result in a terbium concentration of from about 0.25% to about 0.9% by weight, and a zinc compound wherein said zinc compound is provided in an amount sufficient to result in a zinc concentration of from about 0.05% to about 1.0% by weight, said zinc concentration and said terbium concentration resulting in a green/blue emission ratio in the subsequently produced phosphor of from about 0.7 to about 2.0, said ratio increasing as said zinc concentration increases and as said terbium concentration increases;
    (b) heating said mixture in an air atmosphere in a covered vessel at a temperature of from about 900° C. to about 1400° C. for a sufficient time to form terbium-activated gadolinium oxysulfide;
    (c) washing said terbium-activated gadolinium oxysulfide with deionized water to remove essentially all of any water soluble impurities which are present; and
    (d) annealing the resulting washed terbium-activated gadolinium oxysulfide in air at a temperature of from about 525° C. to about 590° C. for about 1 hour to about 3 hours to enhance the brightness of said phosphor.

2. A terbium-activated gadlinium oxysulfide phosphor having a green/blue emission ratio of from about 0.7 to about 2.0, said phosphor being produced by the process of claim 1.

* * * * *